Nov. 24, 1959   J. MEISEN   2,913,790
CABLE CLAMP
Filed Jan. 19, 1955   3 Sheets-Sheet 2
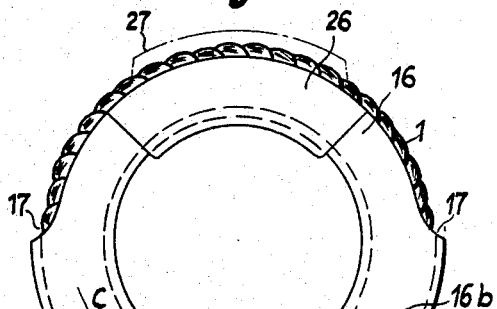
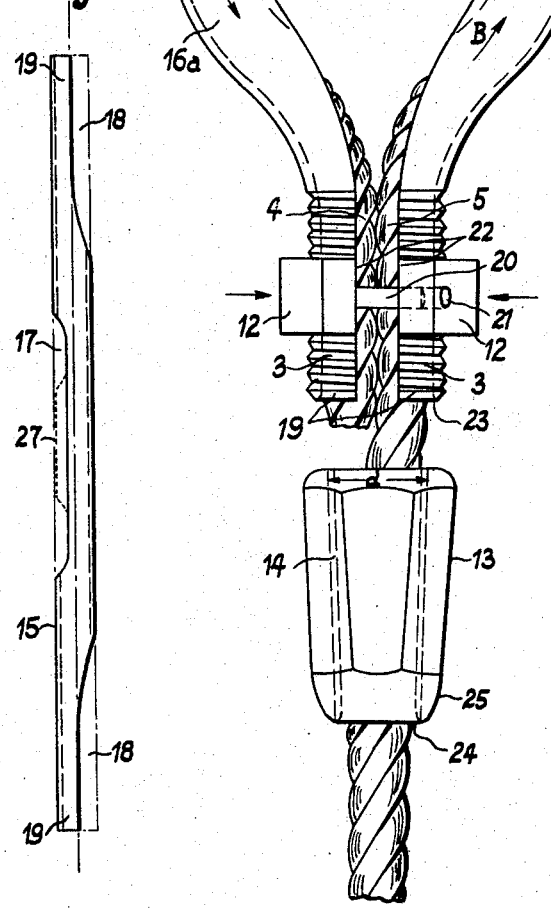
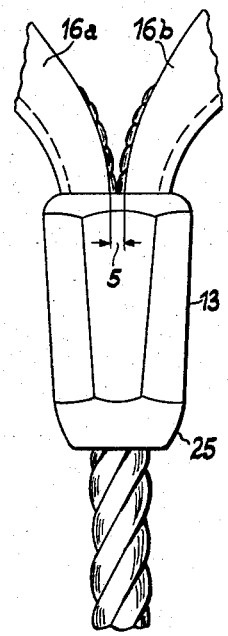
INVENTOR:
JOHANN MEISEN
BY:

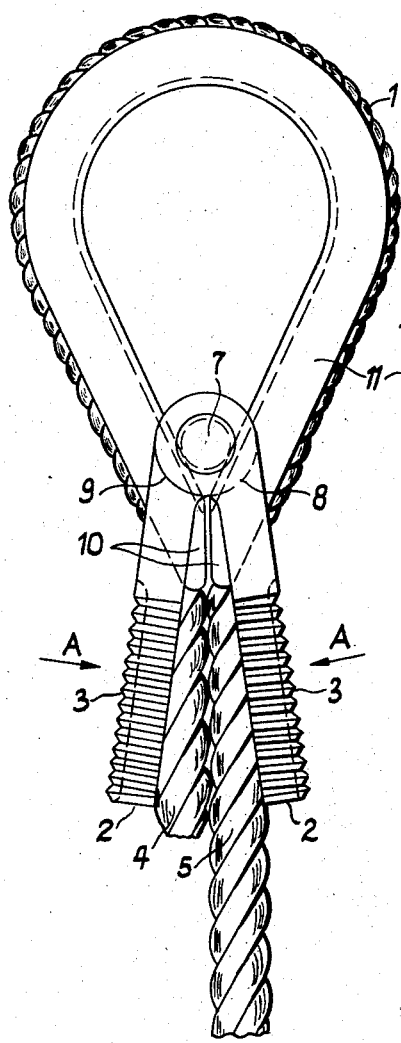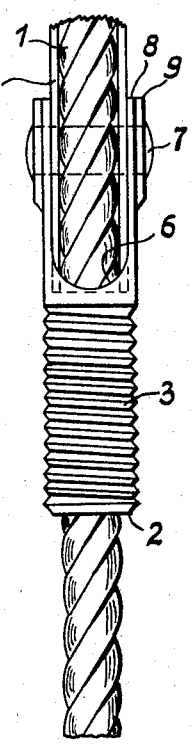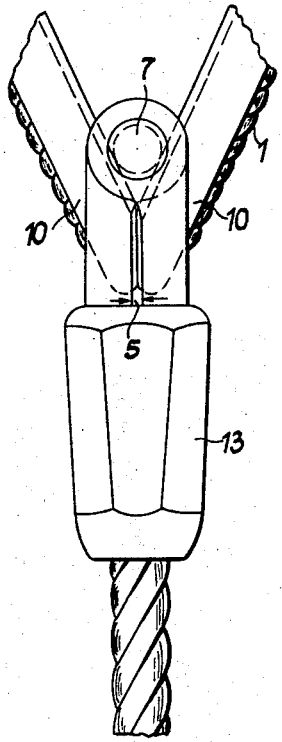

Nov. 24, 1959    J. MEISEN    2,913,790
CABLE CLAMP

Filed Jan. 19, 1955    3 Sheets-Sheet 3

INVENTOR:
JOHANN MEISEN
BY:

United States Patent Office 2,913,790
Patented Nov. 24, 1959

2,913,790

CABLE CLAMP

Johann Meisen, Augsburg, Germany

Application January 19, 1955, Serial No. 482,865

Claims priority, application Germany December 4, 1954

3 Claims. (Cl. 24—124)

This invention relates to a detachable cable clamp for the production of a loop which is capable of taking tension loads and has for one of its objects to generally improve the construction of such devices to provide a compact, simple article of this class which will be inexpensive in the cost of manufacture although strong and durable.

A special object of the invention is to provide a cable clamp which is constructed in such a way that it does not have any protruding edges or other projections which might catch on things with resulting physical injury of bodies or objects.

With these and further objects in view, my novel detachable cable clamp comprises a pair of gripping jaws in the form of half-tubes which are provided with external thread while their internal diameter corresponds to the diameter of the cable, said clamping jaws being recessed at one end for the passage of the cable end and being connected to each other by a member preventing relative movement of the jaws in an axial direction, and an internally threaded clamping nut, preferably with conical thread, adapted to be screwed on the gripping jaws embracing and compressing the two rope elements. This detachable rope clamp serving for the production of cable loops offers the advantage that a relatively short clamping connection with small diameter, i.e., a compact clamp is created which yet produces a very large clamping force preventing slipping of the rope ends in the clamp even with large tension forces. My novel detachable cable clamp also permits a simple and cheap production, assembling and dismantling.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 7:
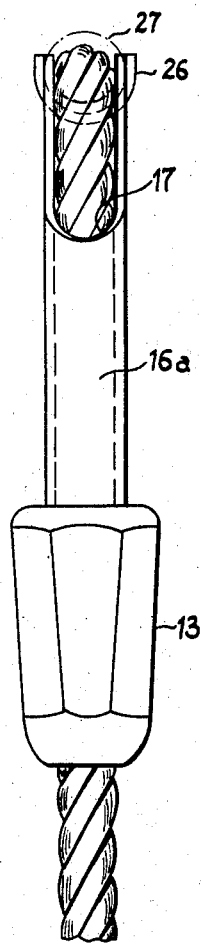
Figure 8:
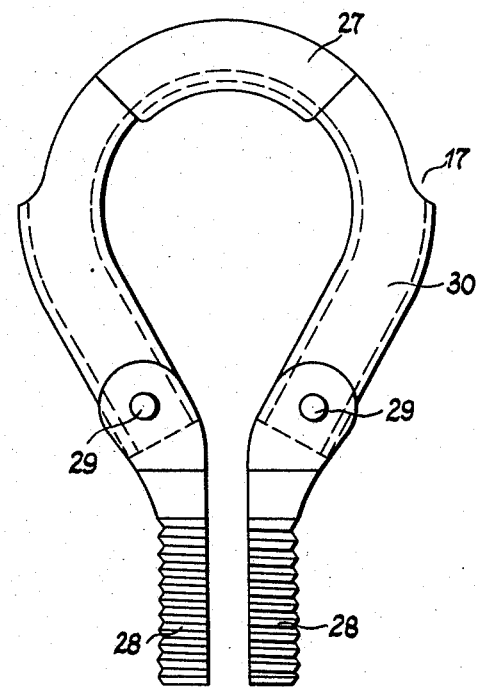

Fig. 1 is an elevation of a cable clamp having the invention applied thereto, without clamping nut, in combination with a normal grummet thimble, Fig. 2 is a side view thereof, Fig. 3 is a view similar to Fig. 1, with screwed-on clamping nut, Fig. 4 is an elevational view of a modification, Fig. 5 is a view showing a tube serving for the production of the grummet thimble and clamp shown in Fig. 4, Fig. 6 is a view showing the lower part of the thimble as per Fig. 4 with the clamping nut screwed on, Fig. 7 is a side view of the thimble and clamp as per Fig. 4, and Fig. 8 is an elevational view showing a further modification.

Similar reference numerals denote similar parts in the different views.

Referring now to the drawings in greater detail, it will be seen that the detachable cable clamp serving to produce a loop 1 comprises two semi-tubular gripping jaws 2 which are provided with external thread 3. The internal diameter of these gripping jaws is a little larger than the diameter of the cable, so that the two cable elements or sections 4 and 5 are received or embraced by these gripping jaws which at one end are provided with recesses 6 through which the cable end is to be threaded, and which moreover are connected with each other by a member permitting movement of the gripping jaws perpendicularly to each other, as indicated by arrows A, but not permitting their axial movement against each other. In the embodiment shown in Figs. 1–3 the gripping jaws are connected to each other by a riveted pin or bolt 7, the upper ends of the gripping jaws forming flat eyes 8 and 9 and being recessed in such a way that the ends 10 of a normal grummet thimble 11 can be passed through these recesses. For this purpose the ends 10 of the thimble are slightly bent up and passed through these recesses, and finally said ends of the thimble are again bent together, so that the clamp assumes the position indicated in Fig. 1. The wire rope or cable may now be passed through the recesses 6 of the gripping jaws or threaded into the clamp 2 and thimble 11 in accordance with Fig. 1. Now the gripping jaws 2 of Fig. 1 are heavily compressed in a vice, in the direction A, preferably with the use of two half nuts 12 indicated in Fig. 4, which are compressed in a vice, drawing the cable loop 1 tightly around the thimble 11. After such compression of the clamping jaws 2 a clamping nut 13, preferably having a slightly tapered or conical thread 14, Fig. 4, is screwed onto the external thread 3 of the clamping jaws, so that the two cable elements 4 and 5 are compressed very tightly over the entire length of the gripping jaws, with approximately uniform compression. The two gripping jaws 2 hereat are compressed, leaving only a small gap "s" Fig. 3.

The cable clamp shown in Figs. 1 to 3 offers the advantage that it can be used in combination with normal grummet thimbles, it being also possible, however, to use this cable clamp for producing loops without thimble. The gripping jaws 2 instead of being connected at one end by a riveted bolt, may be joined in some other way, so that a longitudinal relative displacement of the two jaws is impossible, but that the gripping jaws can be opened and closed as per Fig. 1.

Figs. 4, 6, and 7 show a special combination of my novel detachable cable clamp with a grummet thimble. In this case, the thimble 16 which is bent from a tube 15, Fig. 5, is recessed in an intermediate external part at 17 for passage of the rope end, and the tubular halves 18, Fig. 5, facing each other are cut off at the parallelly extending ends of the thimble, so that the remaining ends of the thimble form complementary semi-tubular gripping jaws 19.

The tube serving for the production of this thimble and being shown in Fig. 5 in its original form in dot and dash lines is worked in the manner as hereinbefore described and then bent into the thimble shape in hot condition. The thimble ends 19 compressed accordingly are then formed with an external thread 3. The rope 7 is now drawn into the thimble in the direction of the arrows B and C, Fig. 4, so that one half of each of the two cable elements is disposed in one of the gripping jaws 19, respectively. With the aid of the half nuts 12 which advantageously are guided in relation to each other by pins 20 engaging in bores 21, the jaws 19 are now tightly compressed in a vice, and the clamping nut 13 provided with conical internal thread 14 is screwed on, as shown in Fig. 6. In this way, an extremely strong and detachable clamp joint is created.

In order to safely prevent injury of the rope, the longitudinal edges 22 of the gripping jaws are rounded on their inner side, and the lower internal edge of the gripping jaws is also rounded off at 23. The clamping nut is rounded or bevelled at its lower end not only inside, at 24, but also outside, at 25, so as to prevent any catching of the nut when working with the grummet thimble.

As indicated in the drawing, the clamping nut 13 moreover is formed as a conical hexagonal nut, so that it can easily be screwed on with a hexagonal wrench which owing to the conical shape of the nut may be of different size. In order to ensure a reliable gripping effect, the thread 3 of the clamping nut has a length which is larger than twice the diameter "$d$" of the thread.

In the embodiment shown in Fig. 4 the medium part of the thimble is reinforced by a fish-plate member 26 having a U-shaped cross section and being fixedly connected to the thimble by soldering or welding.

As indicated in Fig. 4, the middle part of the thimble if desired may also consist of a closed length of tube 27 as indicated in dot and dash lines, so that the recesses 17 for passing the cable in this case are provided on both sides of this length of tube 27.

The cable 7 may be introduced into the thimble shown in Fig. 4 in the manner as hereinbefore described. If desired, the gripping jaws 28 may be jointed to a tubular thimble 30 by means of pivot pins 29 for facilitating the passage of the rope, as shown in Fig. 8. It will be appreciated that my novel detachable clamp or the combination of this clamp with a thimble can be made with relatively low cost and permits a quick and easy assembling and dismantling of the rope.

A particular advantage of the thimble shown in Fig. 4 consists in the fact that the tubular legs 16a and 16b surround the cable, thus forming an excellent protection against wear of the rope.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. A clamp for clamping cable sections to each other, comprising, in combination, a pair of elongated jaw members each having a free end, said jaw members being pivotally connected to each other for movement about a pivot axis between a closed position wherein said jaw members are substantially coextensive with each other and are adapted to clamp two cable sections to each other and a spread apart position wherein said jaw members form an angle with each other and permit the introduction and removal of said cable sections, each of said jaw members being formed with an opening spaced from the respective free end through which a cable section may be passed into the space between said jaw members and extend within said space; and means for maintaining said jaw members in said closed position thereof, said means including a retaining member formed with a bore therethrough and adapted to surround and tightly engage the free ends of said jaw members in said closed position thereof, whereby two cable sections passed through said openings of the respective jaw members, while the same were in said spread apart position thereof, may be maintained clamped to each other in said space between said jaw members when the latter are moved into and maintained in said closed position thereof, by said retaining member.

2. A clamp as defined in claim 1 wherein each of said jaw members is so constructed and arranged that a cable section may be passed through the opening of each respective jaw member in a direction transverse to a plane which passes through said pivot axis and which contains a line extending in the direction of the length of the respective jaw member.

3. A clamp for clamping cable sections to each other comprising, in combination, a pair of elongated jaw members each having a free end, said jaw members being pivotally connected to each other for movement about a pivot axis between a closed position wherein said jaw members are substantially co-extensive with each other and are adapted to clamp two cable sections to each other and a spread apart position wherein said jaw members form an angle with each other and permit the introduction and removal of said cable sections, each of said jaw members being formed with an opening spaced from the respective free end through which a cable section may be passed into the space between said jaw members and extend within said space, each of said jaw members having at least in the region of its free end an arcuate semi-cylindrical cross-section and being formed in said region with external threads; and means for maintaining said jaw members in said closed position thereof, said means including a retaining member formed with internal threads adapted to mate with that external threads of said jaw members, whereby two cable sections passed through said openings of the respective jaw members, while the same are in said spread apart positions thereof, may be maintained clamped to each other in said space between the jaw members when the latter are moved into said closed positions thereof and be maintained in said closed position by said means.

References Cited in the file of this patent

UNITED STATES PATENTS

| | | |
|---|---|---|
| 129,860 | Pimer | July 23, 1872 |
| 339,399 | Gale | Apr. 6, 1886 |
| 570,631 | Hannum | Nov. 3, 1896 |
| 880,090 | McMahon | Feb. 25, 1908 |
| 1,427,114 | Martin | Aug. 29, 1922 |
| 2,155,536 | Fauria | Apr. 25, 1939 |
| 2,165,695 | Campbell | July 11, 1939 |
| 2,272,933 | Conohan | Feb. 10, 1942 |

FOREIGN PATENTS

| | | |
|---|---|---|
| 104,650 | Great Britain | Mar. 15, 1917 |
| 896,872 | France | 1945 |